US012391229B2

(12) United States Patent
Suarez-Seminario et al.

(10) Patent No.: US 12,391,229 B2
(45) Date of Patent: Aug. 19, 2025

(54) HYDRAULIC UNIT, MORE PARTICULARLY FOR THE OPEN-LOOP AND CLOSED-LOOP CONTROL OF BRAKE PRESSURE IN A BRAKE CIRCUIT OF AN ELECTRONICALLY SLIP-CONTROLLABLE BRAKING SYSTEM OF A MOTOR VEHICLE AND METHOD FOR ASSEMBLING A HYDRAULIC UNIT

(71) Applicant: Robert Bosch Gesellschaft Mit Beschrankter Haftung, Stuttgart (DE)

(72) Inventors: Dariusz Suarez-Seminario, Achern (DE); Thomas Zander, Oberstaufen (DE); Jennifer Keck, Buchenberg (DE); Thomas Kimpel, Moessingen (DE); Peter Pochert, Kusterdingen-Jettenburg (DE); Ingmar Joas, Feuchtwangen (DE); Michael Loeffler, Oberstaufen (DE); Bert Niggebruegge, Reutlingen (DE); Benjamin Heyne, Karlsruhe (DE); Thilo Stephan, Heilbronn (DE); Michael Schlitzkus, Dietmannsried (DE)

(73) Assignee: Robert Bosch Gesellschaft Mit Beschrankter Haftung, Stuttgart (DE)

( * ) Notice: Subject to any disclaimer, the term of this patent is extended or adjusted under 35 U.S.C. 154(b) by 448 days.

(21) Appl. No.: 18/009,824

(22) PCT Filed: Feb. 25, 2021

(86) PCT No.: PCT/DE2021/100190
§ 371 (c)(1),
(2) Date: Dec. 12, 2022

(87) PCT Pub. No.: WO2021/254552
PCT Pub. Date: Dec. 23, 2021

(65) Prior Publication Data
US 2023/0242086 A1 Aug. 3, 2023

(30) Foreign Application Priority Data
Jun. 17, 2020 (DE) .................... 10 2020 207 505.0

(51) Int. Cl.
| B60T 13/66 | (2006.01) |
| B60T 8/176 | (2006.01) |
| B60T 17/00 | (2006.01) |

(52) U.S. Cl.
CPC ............ *B60T 13/662* (2013.01); *B60T 8/176* (2013.01); *B60T 17/00* (2013.01); *B60T 2270/10* (2013.01)

(58) Field of Classification Search
CPC ........ B60T 13/662; B60T 17/00; B60T 8/176; B60T 2270/10; B60T 8/368; B60T 11/236; B60Y 2400/81; B60Y 2410/10
See application file for complete search history.

(56) References Cited

U.S. PATENT DOCUMENTS 9,187,072 B2 * 11/2015 Hisada .................. B60T 11/236
2001/0002978 A1 * 6/2001 Siegel .................. F04B 53/126
92/170.1

(Continued)

FOREIGN PATENT DOCUMENTS

| CN | 101121405 A | 2/2008 |
| CN | 207617706 U | 7/2018 |

(Continued)

OTHER PUBLICATIONS

Japanese Patent No. JP 2001518165 published on Oct. 9, 2001.*

(Continued)

*Primary Examiner* — Pamela Rodriguez
(74) *Attorney, Agent, or Firm* — Maginot, Moore & Beck LLP

(57) ABSTRACT

A hydraulic unit with open-loop and closed-loop control of brake pressure in a brake circuit of an electronically slip-controllable braking system of a motor vehicle includes a pump housing, a motor for driving a brake pressure generator, and an electronic control device for controlling the motor in line with demand. The motor and the control device are disposed on opposite sides of the pump housing, and a shaft bore extending all the way through is formed therebe- (Continued)

tween, in which shaft bore a motor shaft which can be rotationally driven is disposed. A sealing apparatus seals the shaft bore with respect to an interior of the electronic control device. A sealing apparatus which comprises an insertion seal is disposed on the pump housing in a seal socket and a mechanical preloading force is applied by a preloading apparatus. A method of assembling the hydraulic unit is also provided.

14 Claims, 1 Drawing Sheet

(56) References Cited

U.S. PATENT DOCUMENTS

| | | | |
|---|---|---|---|
| 2004/0144248 A1* | 7/2004 | Ishida | F16J 15/3216 92/240 |
| 2014/0203625 A1 | 7/2014 | Starr | |
| 2019/0140523 A1* | 5/2019 | Schlitzkus | H02K 11/21 |

FOREIGN PATENT DOCUMENTS

| | | |
|---|---|---|
| DE | 10 2017 218 648 A1 | 4/2019 |
| GB | 2 266 752 A | 11/1993 |
| JP | 2004-538211 A | 12/2004 |
| JP | 2019-77436 A | 5/2019 |
| JP | 2019-119270 A | 7/2019 |
| WO | 2014/113262 A1 | 7/2014 |

OTHER PUBLICATIONS

German Patent No. DE 102012215578 to Kratzer published on Mar. 6, 2014.*
German Patent No. DE 102019217548 to Schlitzkus published on May 20, 2021.*
International Search Report corresponding to PCT Application No. PCT/DE2021/100190, mailed Jul. 19, 2021 (German and English language document) (5 pages).

* cited by examiner

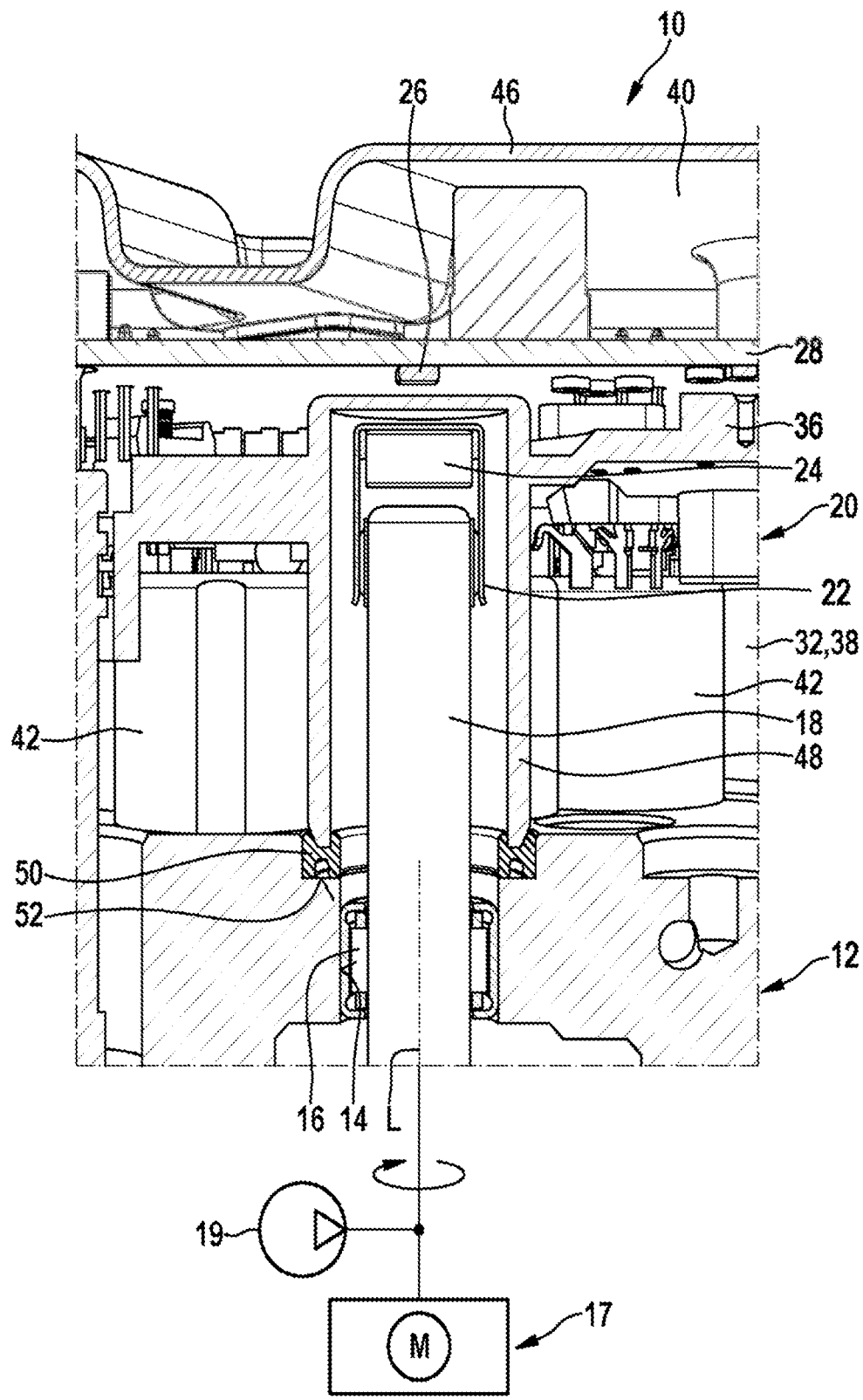

HYDRAULIC UNIT, MORE PARTICULARLY FOR THE OPEN-LOOP AND CLOSED-LOOP CONTROL OF BRAKE PRESSURE IN A BRAKE CIRCUIT OF AN ELECTRONICALLY SLIP-CONTROLLABLE BRAKING SYSTEM OF A MOTOR VEHICLE AND METHOD FOR ASSEMBLING A HYDRAULIC UNIT

This application is a 35 U.S.C. § 371 National Stage Application of PCT/DE2021/100190, filed on Feb. 25, 2021, which claims the benefit of priority to Serial No. DE 10 2020 207 505.0, filed on Jun. 17, 2020 in Germany, the disclosures of which are incorporated herein by reference in their entirety.

SUMMARY

The disclosure relates to a hydraulic unit, more particularly for the open-loop and closed-loop control of brake pressure in a brake circuit of an electronically slip-controllable braking system of a motor vehicle according to the features of the disclosure, and also a method for assembling a hydraulic unit according to the features of the disclosure.

Electronically slip-controllable braking systems in motor vehicles are well known. They contribute to increased safety in road traffic and are therefore prescribed by law in many countries.

With electronically slip-controllable braking systems, the brake pressures in the wheel brakes of a vehicle can be controlled electronically such that a wheel slip occurring at the associated wheels of the vehicle occurs for only a short period of time. In this way, the vehicle remains steerable during braking operations, does not get into an unstable driving state and can still be decelerated over a short braking distance. Electronically slip-controllable vehicle braking systems are also able to initiate and control braking processes independently, i.e., without driver intervention, as a function of an accident-prone traffic situation or a critical driving state. Furthermore, electronically slip-controllable braking systems are important in the technical implementation of a piloted or automated driving operation.

BACKGROUND

The mentioned brake pressure control within an electronically slip-controllable braking system is performed by a so-called hydraulic unit, as is already known, for example, from DE 10 2017 218 648 A1.

This known hydraulic unit comprises a pump housing, which is equipped inter alia with a drivable brake pressure generator. The latter is actuated by a motor via a rotationally driven motor shaft. In this context, the motor is electrically controlled by an electronic control device as required.

In the known hydraulic unit, the motor and the electronic control device are disposed on opposite sides of the pump housing from each other. The motor shaft is rotatably mounted in the interior of a shaft bore, which penetrates the pump housing from the side on which the motor is disposed to the opposite side on which the electronic control device is disposed. The angle of rotation of the motor shaft is detected by means of a sensor device consisting of a signal transmitter revolving with the motor shaft and a signal receiver which is housed in a stationary manner in the electronic control device. The shaft bore is sealed with respect to the interior of the electronic control device by means of a sealing apparatus so that a potential leak of pressure medium in the pump housing does not penetrate, via the shaft bore, the interior of the electronic control device where it can cause interference.

The present disclosure differs from said prior art inter alia by the use of an insertion seal for sealing the shaft bore with respect to the electronic control device. Said insertion seal is disposed in a seal socket formed on the pump housing and is subjected to a preloading force by a preloading apparatus when the electronic control device is fastened to the pump housing.

Insertion seals are available on the market in many variations at inexpensive prices, are easy to handle in the manufacturing process, and the manufacturing quality is easy to check during assembly, for example optically, using cameras, or mechanically by measuring probes. In addition, an assembly-induced offset of the electronic control device relative to the pump housing is easily compensated for with an insertion seal. A mechanically preloaded insertion seal accommodates thermally induced expansion tolerances as well as dimensional tolerances between the housing of the electronic control device, which is usually made of plastics material and the pump housing, which is usually made of an aluminum alloy.

Furthermore, the sealing properties of an insertion seal can be predetermined under known installation conditions and can thus be adapted to a relevant application as required. By way of example, axial and radial forces, by means of which the insertion seal in the preloaded state is pressed against the boundaries of the associated seal socket, can be determined by structurally adjusting the material, shape and dimensions of the insertion seal, the preloading apparatus and the seal socket.

In particular with respect to liquid seals, insertion seals have the advantage that complex metering devices and the process time for curing an introduced sealing mass can be eliminated and that the assemblies sealed against one another can be detached from one another more easily and, if necessary, can be interchanged.

Further advantages or advantageous developments of the disclosure can be found in the summary or in the following description.

In an advantageous development of the disclosure, an axial force directed in the direction of a longitudinal axis of the motor shaft is applied to the insertion seal by the mechanical preloading apparatus. Said axial force ensures a reliable sealing effect of the insertion seal under changing ambient conditions.

It is further advantageous if a device housing of the electronic control device comprises an intermediate floor facing the pump housing, from which floor the preloading apparatus projects in the direction of a longitudinal axis of the motor shaft. By means of an intermediate floor, the interior of an electronic control device can be divided into an installation compartment facing the pump housing for coil assemblies of solenoid valves and into a circuit board compartment facing away from the pump housing for receiving the electronic controller.

A preloading apparatus, which is preferably formed in one piece with the housing floor of the device housing, has the advantage that it can be mounted, together with the electronic control device, on the pump housing and thus no additional parts or assembly requirements are needed. In addition, the effective axial force, by means of which the preloading apparatus presses against the insertion seal, can thus be structurally adjusted within narrow tolerance limits and maintained in large-scale production.

Preferably, the preloading apparatus is designed in the form of a hollow body that is closed on one side, the closed end of which is located in the interior of the electronic control device and into the open end of which an end of the motor shaft that is remote from the motor projects in portions.

This embodiment allows the motor shaft mounted in the pump housing to extend beyond the pump housing into the interior of the electronic control device and for a signal transmitter required to detect the angle of rotation of the motor shaft to be disposed at the end of the motor shaft. The associated signal receiver can be placed directly opposite thereto directly on the printed circuit board of the electronic control device so that separate contact means for electrically contacting said signal receiver with the circuit board are eliminated.

In a further advantageous development of the disclosure, the seal socket is a recess which surrounds the shaft bore on the peripheral side and is open on the outside toward the surroundings of the pump housing. A base of said recess forms a shoulder on which the insertion seal is supported in the axial direction. The fastening of the electronic control device to the pump housing ensures that the preloading apparatus formed thereon is aligned with the seal socket of the pump housing.

A seal made of elastic plastics material or of an elastic plastics composite material can be used as the insertion seal. This, together with differently designed seal cross sections, allows the greatest possible freedom in structurally adjusting the seal properties to the relevant application.

The proposed sealing concept is particularly suitable for hydraulic units of vehicle braking systems which are equipped with an electronically commutated motor. Such motors have advantages with respect to service life, dynamics and size, but they must be electrically controlled as a function of the angle of rotation of the motor shaft or of the rotor. The latter is detected by means of a signal transmitter on the motor shaft and a signal receiver interacting therewith in the electronic control device.

Said electronic control device is reliably sealed with respect to the pump housing, which is acted on by a pressure medium, by means of the sealing apparatus designed according to the disclosure, without the signal transmission between the signal transmitter and the signal receiver being impaired.

Finally, what is also important in terms of a potential failure is the possibility provided by the disclosure of non-destructive dismantling of the hydraulic unit into its components and of replacing the electronic control device or the pump housing.

BRIEF DESCRIPTION OF THE DRAWINGS

The disclosure is illustrated in the drawing and is explained in detail in the following description.

Said drawing comprises a single FIGURE in which a region of a hydraulic unit that illustrates the disclosure is shown in a longitudinal section.

DETAILED DESCRIPTION

The region of a hydraulic unit (10) shown in the single FIGURE comprises, inter alia, a detail of the pump housing (12) in which a portion of a shaft bore (14) is located. A rolling bearing (16), which rotatably supports a motor shaft (18) in the interior of the shaft bore (14), is disposed in said portion of the shaft bore (14). Further bearings necessary for this purpose are not discernible due to the limited detail in the FIGURE. A motor (17), by means of which the motor shaft (18) can be rotationally driven, is only indicated schematically in the FIGURE. Also shown merely schematically is a brake pressure generator (19), for example a radial piston pump driven by an eccentric mounted on the motor shaft (18), which generator is actuated by the rotating motor shaft (18).

The motor shaft (18) projects with its shaft end that is remote from the motor beyond the boundary of the pump housing (12) into the hollow interior of an electronic control device (20) disposed on this side of the pump housing (12). A cup-shaped holding element (22), which is closed on one side, is attached to the protruding end of the motor shaft (18). A signal transmitter (24) is accommodated therein at a distance from an end face of the motor shaft (18). The signal transmitter is connected to the holding element (22) for conjoint rotation, for example by means of an adhesive connection. The signal transmitter (24) is a magnet, the magnetic field of which can be evaluated by a signal receiver (26) for the purpose of detecting the angle of rotation of the motor shaft (18). For this purpose, said signal receiver (26) is disposed opposite the signal transmitter (24) on a printed circuit board (28) of the electronic control device (20) and is contacted with an electrical circuit attached thereto.

The holding element (22) equipped with the signal transmitter (24) is coupled to the motor shaft (18) for conjoint rotation and thus follows the rotational movement of said motor shaft (18).

The electronic control device (20) has a device housing (32), which is preferably made of plastics material. This is fixed to the pump housing (12) and comprises a peripheral wall surrounding an interior of the device housing (32). Said interior is divided by an intermediate floor (36) extending transversely to the peripheral wall into a coil compartment (38) facing the pump housing (12) and into an electronics compartment (40) which is located facing away from said coil compartment and receives the printed circuit board (28) of the control electronics. In a preferred embodiment, the intermediate floor (36) forms a frame component, which is provided with openings which connect the two compartments to one another.

Coil assemblies (42) of solenoid valves for pressure medium control are accommodated in the coil compartment (38) of the device housing (32). Said coil assemblies (42) consist of a solenoid arranged under a valve cap. The part of the hydraulic valves that controls the pressure medium is not discernibly anchored in associated recesses on the pump housing (12) and projects in each case with a valve dome protruding beyond the boundary of the pump housing (12) into the interior of said solenoids. A valve member that can be actuated by the magnetic field of the coils is accommodated in the valve dome (not shown). Electrical contact elements, via which the electrical contacting of the coil assemblies (42) with the printed circuit board (28) of the electronic control device (20) takes place, are attached to the intermediate floor (28).

In the electronics compartment (40) of the electronic control device (20), said printed circuit board (28) is preferably oriented at a distance plane-parallel to the intermediate floor (36) and equipped with electronic components. Conductor tracks that are present on the printed circuit board (28) connect the components to an electrical circuit, by means of which demand-adjusted closed-loop control of a brake pressure is possible.

The electronics chamber (40) is open toward the environment on its side facing away from the pump housing (12)

and is closed there by a housing cover (46). Said housing cover (46) protects the interior of the electronic control device (20) from contaminants or penetrating moisture from the surroundings of the hydraulic unit (10). In the exemplary embodiment, the housing cover consists of metal and is, for example, three-dimensional.

A preloading apparatus (48) in the form of a cup or hollow body which is closed on one side is preferably formed in one piece with the intermediate floor (36). The closed end of the apparatus is located in the electronics compartment (40) of the device housing (32), and the motor shaft (18) with the mounted holding element (22) and the signal transmitter (24) accommodated therein projects into the open end of the apparatus in portions. The preloading apparatus (48) protrudes perpendicularly and thus in the direction of a longitudinal axis L of the motor shaft (18) from the intermediate floor (36) and, in the assembled state of the control device (20), penetrates the coil compartment (38). With the end face of a portion protruding with respect to the coil compartment (38), the preloading apparatus (48) presses, in the region of its open end, against an insertion seal (50) which is disposed in a stepped seal socket (52) of the pump housing (12). Said seal socket (52) surrounds the shaft bore (14) and, in the exemplary embodiment, is open to the surroundings of the pump housing and to the shaft bore (14). Furthermore, a base of the seal socket (52) forms a shoulder on which the insertion seal (50) rests axially.

The mentioned insertion seal (50) itself is annular and can be made of an elastic plastics composite material or an elastic plastics material, for example EPDM or silicone foam. Depending on the application, the insertion seal can be solid or hollow in cross section and have a circular, oval, polygonal or, for example, z-shaped contour. In the exemplary embodiment shown, the insertion seal (50), by way of example, is solid and has a double-T profile.

The axial extension and the radial expansion of the preloading apparatus (48) are structurally adjusted to the dimensions of the pump housing (12) and the device housing (32) such that the end face of the preloading apparatus (48) applies a predetermined axial force to the insertion seal (50) when the control device (20) is attached to the pump housing (12).

The axial force elastically deforms the insertion seal (50) in such a way that the latter reliably rests against the boundaries of the seal socket (52) on the pump housing (12). The insertion seal (50), together with the preloading apparatus (48), thus prevents a leak of pressure medium from the pump housing (12) from being able to penetrate, via the shaft bore (14), the interior of the control device (20) where it can cause interference.

Of course, changes or additions to the described exemplary embodiment are conceivable without departing from the basic idea of the disclosure.

It should be noted at this point that the insertion seal (50) can be disposed separately from the electronic control device (20) in the seal socket (52) before said electronic control device (20) is mounted on the pump housing (12), or that the insertion seal (50) is initially preassembled on the preloading apparatus (48) of the electronic control device (12) and is subsequently mounted on the pump housing (12) together with the electronic control device (20). Both variants are alternatively conceivable.

The invention claimed is:

1. A hydraulic unit configured for open-loop and closed-loop control of brake pressure in a brake circuit of an electronically slip-controllable braking system of a motor vehicle, comprising:
   a pump housing equipped with an actuatable brake pressure generator;
   a motor configured to drive the brake pressure generator; and
   an electronic control device configured to electrically control the motor, wherein:
   the motor and the control device are disposed on opposite sides of the pump housing from one another;
   a shaft bore is formed on the pump housing, which shaft bore extends from a first side of the pump housing on which the motor is disposed to a second side of the pump housing to which the electronic control device is attached;
   a motor shaft configured to be rotationally driven by the motor to form a rotational movement, is rotatably arranged in the interior of the shaft bore;
   a sealing apparatus is configured to seal the shaft bore with respect to an interior of the electronic control device; and
   the sealing apparatus comprises an insertion seal which is disposed in a seal socket of the pump housing and to which a mechanical preloading force is applied by a mechanical preloading apparatus to anchor the electronic control device to the pump housing.

2. The hydraulic unit according to claim 1, wherein an axial force acting in the direction of a longitudinal axis of the motor shaft is applied to the insertion seal by the mechanical preloading apparatus.

3. The hydraulic unit according to claim 1, wherein a device housing of the electronic control device comprises an intermediate floor from which the mechanical preloading apparatus projects in the direction of a longitudinal axis of the motor shaft.

4. The hydraulic unit according to claim 3, wherein the mechanical preloading apparatus is formed in one piece with the intermediate floor of the device housing.

5. The hydraulic unit according to claim 1, wherein the mechanical preloading apparatus is designed in the form of a hollow body that is closed on one side, the closed end of which hollow body is located in the interior of the electronic control device and into the open end of which an end of the motor shaft that is remote from the motor projects.

6. The hydraulic unit according to claim 5, wherein the mechanical preloading apparatus presses against the insertion seal with an end face of its open end.

7. The hydraulic unit according to claim 1, wherein the insertion seal is made of an elastic plastics material or of an elastic plastics composite material.

8. The hydraulic unit according to claim 1, wherein the insertion seal is designed with a solid cross section or with a hollow cross section and has a circular, oval, polygonal or a z-shaped outer contour.

9. The hydraulic unit according to claim 1, wherein the seal socket is a recess which surrounds the shaft bore on a peripheral side and is open toward the surroundings of the pump housing, and has a shoulder on which the insertion seal is supported in a direction of a longitudinal axis of the motor shaft.

10. The hydraulic unit according to claim 9, wherein the seal socket is open toward the shaft bore.

11. The hydraulic unit according to claim 9, wherein the insertion seal in the preloaded state rests against a boundary of the seal socket with a radial and/or axial preload.

12. The hydraulic unit according to claim 1, further comprising:
   a signal transmitter which rotates with the motor shaft and an associated stationary signal receiver configured to detect and electronically evaluate an angle of rotation of the motor shaft using the electronic control device, wherein the associated signal receiver is disposed directly on a printed circuit board of the electronic control device and electrically contacted.

13. The hydraulic unit according to claim 1, wherein the motor is electrically commutated.

14. A method for assembling a hydraulic unit according to the features of claim 1, wherein:

the insertion seal is inserted into the seal socket disposed on the pump housing before the electronic control device is anchored to the pump housing; or the insertion seal is preassembled on the preloading apparatus of the electronic control device and is subsequently mounted together with the electronic control device on the pump housing.

* * * * *